(12) United States Patent
Hayes et al.

(10) Patent No.: US 6,933,467 B2
(45) Date of Patent: *Aug. 23, 2005

(54) METHOD AND APPARATUS FOR WELDING WITH A TRIGGER HOLD

(75) Inventors: L. Thomas Hayes, Oshkosh, WI (US); Kenneth C. Altekruse, Appleton, WI (US); Mark R. Christopher, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/789,162

(22) Filed: Feb. 26, 2004

(65) Prior Publication Data

US 2004/0245229 A1 Dec. 9, 2004

Related U.S. Application Data

(63) Continuation of application No. 10/272,558, filed on Oct. 15, 2002, now Pat. No. 6,781,095, which is a continuation of application No. 09/654,012, filed on Sep. 1, 2000, now Pat. No. 6,476,355, which is a continuation of application No. 09/283,523, filed on Apr. 1, 1999, now Pat. No. 6,114,657.

(51) Int. Cl.$^7$ ................................................ B23K 9/10
(52) U.S. Cl. ................................. 219/137.71; 219/132
(58) Field of Search ........................... 219/137.71, 132, 219/137.7

(56) References Cited

U.S. PATENT DOCUMENTS

| | | | |
|---|---|---|---|
| 2,843,727 A | 7/1958 | Benx, Jr. et al. | |
| 4,430,551 A | 2/1984 | Toth | |
| 4,467,174 A | * 8/1984 | Gilliland | ..................... 219/132 |
| 4,508,954 A | 4/1985 | Kroll | |
| 4,531,045 A | 7/1985 | Kemp | |
| 4,608,482 A | 8/1986 | Cox et al. | |
| 5,864,117 A | * 1/1999 | Kneisley et al. | ............ 219/132 |
| 6,114,657 A | 9/2000 | Hayes et al. | |
| 6,476,355 B1 | * 11/2002 | Hayes et al. | .......... 219/137.71 |
| 6,781,095 B2 | * 8/2004 | Hayes et al. | ................ 219/132 |

OTHER PUBLICATIONS

Miller, The Power of Blue XRA and XRW Technical Manual, Oct., 1997.
Miller, The Power of Blue Dataweld series Technical Manual, Sep. 1998.

* cited by examiner

Primary Examiner—Clifford C. Shaw
(74) Attorney, Agent, or Firm—George R. Corrigan

(57) ABSTRACT

A method and apparatus for welding is disclosed. The method includes sensing the status of a trigger between an on position and an off position. A system latch is set or released based on the trigger status and the latch status. The system latches on when the trigger is held for a predetermined time (and the latch was previously off). The latch is released when the trigger is pulled and released when the latch was previously on. When the latch is off, pulling the trigger turns the system on, and releasing the trigger before the predetermined time turns the system off. The latch may also be released when welding current drops below a threshold. The time might not start until after welding current is flowing. A welding wire feed speed control potentiometer on a torch is also disclosed. The range of the torch potentiometer is from a minimum to a value dependent on the control panel welding wire feed speed. A run-in wire feed speed control is also disclosed. The range of the run-in wire feed speed is from a minimum to a value dependent on the control panel or torch welding wire feed speed.

17 Claims, 4 Drawing Sheets

METHOD AND APPARATUS FOR WELDING WITH A TRIGGER HOLD

RELATED APPLICATIONS

This is a continuation of, and claims the benefit of the filing date of, U.S. patent application Ser. No. 10/272,558 filed Oct. 15, 2002 now U.S. Pat. No. 6,781,095, entitled Method Apparatus for Welding With A Trigger Hold, which is a continuation of, and claims the benefit of the filing date of U.S. patent application Ser. No. 09/654,012, filed Sep. 1, 2000, entitled Method and Apparatus for Welding With A Trigger, issued as U.S. Pat. No. 6,476,355 on Nov. 5, 2002, which is a continuation of, and claims the benefit of the filing date of, U.S. patent application Ser. No. 09/283,523 filed Apr. 1, 1999, entitled Method and Apparatus for Welding With A Trigger Hold, which issued as U.S. Pat. No. 6,114,657 on Sep. 5, 2000.

FIELD OF THE INVENTION

The present invention relates generally to the art of welding power supplies. More specifically, it relates to controlling welding power supplies having a wire feeder and controller.

BACKGROUND OF THE INVENTION

Many welding applications such as MIG (metal inert gas) or GMAW (gas metal arc welding) utilize a welding power supply (system) with a wire feeder to provide filler metal to the weld. A welding power supply or system as used herein includes one or more of the following components: a wire feeder, a power source or source of power, a torch or gun, a wire feeder controller, and a power source controller to control the various components (it may also exclude some of these components, such as the power source). The components may be packaged discreetly, or In various combinations. Additionally, the wire feeder controller may be part of, distinct from but cooperates with, or independent of the power source controller.

One prior art welding power supply/wire feeder system includes a Miller XRA or XRW® wire feeder used in combination with a Miller Delta Weld® power source. This system has the control panel, including user selectable devices, on the front or control panel of the wire feeder.

Generally, the wire feeder motor will provide wire at a nominally constant speed (typically given in inches per minute) in response to the wire feed speed controller. The power source welding output is likewise responsive to the welding power source controller. The controllers have user selectable devices to allow the user to set parameters such as weld wire feed speed, weld current, weld voltage, and run-in wire feed speed. The input devices are typically potentiometers mounted on the control panel of the system or wire feeder, but may include other user selectable input devices, including digital devices. The user sets the parameters, and then pulls a trigger on a torch to begin welding. The trigger activates the wire feeder, causing it to feed wire. The trigger also activates the source of power, causing it to provide output power (often by closing a relay or contactor).

Wire feed welding power supplies are used for a variety of processes, including spot or tack welding, and continuous welding. Some applications use both processes. For example, when assembling a truck frame or other large object, the welder will often spot weld around the edge of the frame to tack the frame together, and then fill in with a continuous weld. Welding power supplies often come with many feet (30, 50 or 100 or more) of welding cable to accommodate welding various sides of such large objects. The power supply or system can then be left on one side of the object to be welded, and the welder can pass the torch cable around or underneath, and weld the opposite side without moving the power supply or system.

Tack welding is performed by periodic activation of the source of power and wire feeder, to weld in a specific location. Activation is typically accomplished by pulling a trigger on the torch. The trigger is released when the spot or tack weld is completed, and the source of power shuts down and wire feeder stops.

Continuous welding is accomplished by pulling the trigger, and the power source provides power and/or the wire feeder feeds wire, so long as the trigger remains pulled. Some prior art systems included a trigger hold or latch feature. With this feature, pulling the trigger latches the power supply or system on until the trigger is retriggered.

There are a variety of prior art trigger hold implementations. One is a simple design which automatically latches or unlatches each time it is pulled. This type of prior art system typically uses an alternating relay, or its electronic equivalent, and the circuit merely provides that the first trigger closure initiates the welding operation, and the second trigger closure will terminate it. One disadvantage of this type of system is that the operator could walk away from the system before terminated welding operation, and the system would continue to operate. Similarly, an inadvertent triggering, such as a person bumping the trigger, could also cause the system to be initiated. This may be dangerous and will likely cause an undesirable amount of wire to be fed before shutting down by retriggering.

Another type of trigger hold system relies on a current sensing relay to latch the system in operation. However, this requires that the arc be terminated in order to stop the wire feeding, which often results in too much wire being drawn from the tip of the torch when the operator pulls the torch away from the workpiece to extinguish the arc.

The Miller 50M Intellmatic® wire feeder had a nonstandard option that included a trigger latch which was set by pulling the trigger, and then releasing the trigger prior to the expiration of period of time. If the trigger was not released within the period of time then the latch was not set, and continuous welding was performed manually.

A trigger hold system described in U.S. Pat. No. 4,531,045 combines the three previously described systems by requiring the welder to pull a trigger, hold the trigger pulled until current flow was established, and then within one second of the initiation of current flowing, release the trigger to set the latch. The latch is removed by retriggering. After a two second delay the system may be turned on again by another trigger.

These prior art trigger hold schemes are designed for only continuous welding, and each does not work well for spot welding applications. Each will cause the latch to be set when tack welding (because the time to weld the tack will likely be less than the threshold). Thus, to stop the tack weld the trigger would have to be retriggered, often resulting in excess wire feeding for the tack weld.

Some prior art systems attempted to overcome this disadvantage by providing a toggle switch on the control panel that allowed the user to select between the trigger hold mode, and a non-hold mode (useful for spot welding). Unfortunately, for applications where the welder is some distance from the control panel (such as welding on a truck frame or the opposite side of another large object) it is not convenient for the welder to switch between spot or tack welding and continuous welding.

Accordingly, a trigger hold that is useful for both continuous and tack or spot welding is desirable. Such a trigger hold will preferably be operable by the user, at the torch, and will cause the system to latch on for continuous welding, but will not cause the system to latch on when tack or spot welding.

Some prior art welding power supply/wire feeder systems allow the user to set to the wire feed speed at the torch. This allowed the user to adjust the wire feed speed, without returning to the control panel. Typically, the torch controller was a pot that allowed the user to select the full range of speeds. One disadvantage of this type of torch control is that the relatively small knob on the torch was used to control the full range of speeds, and it was difficult for the user to "dial in" the desired speed. Accordingly, a welding wire feed speed control located on the torch, that allows the user to more accurately select the speed is desirable.

Prior art welding power supplies/wire feeders also sometimes include a feature called run-in. Run-in allows the welder to control the speed at which the wire approaches the workpiece prior to the arc forming and welding starting. Prior art controllers allow the welder to select the run-in speed at any speed over the entire range of wire feed speeds. This, however, is dis-advantageous because it may be difficult to select the proper run-in speed, relative to the wire feed speed during welding. Accordingly, a run-in control that allows the welder to select the wire feed speed during run-in, relative to the wire feed speed during welding is desirable.

SUMMARY OF THE PRESENT INVENTION

According to a first aspect of the invention a method of providing welding power includes sensing the status of a trigger between an on position and an off position. If the trigger is moved to the on position, and wire is not being fed, then one or both of providing power to the weld and feeding wire is initiated. If the trigger is moved from the on position to the off position within a predetermined period of time after the trigger was moved to the on position then no more power is provided, and/or no more wire is fed. If the trigger is moved from the on position to the off position after the predetermined period of time after the trigger was moved to the on position, then the system is latched on by continuing to provide power to the weld and/or continuing feeding wire even when the trigger is released. If the trigger is retriggered, the latch condition is ended by stopping the providing of power to the weld and/or stopping the feeding of wire.

According to one alternative power is controlled on and off by closing and opening a power contactor.

According to another alternative the latch condition is left when welding current drops below a threshold, and/or the latch condition is entered after the predetermined period of time has past and when welding current is flowing.

The predetermined period of time is user adjustable according to another alternative.

A second aspect of the invention is a welding system including a source of power and a controller. The controller includes a trigger input that indicates whether a trigger is on or off, and has a wire feeder control output and/or a power control output. A trigger on circuit responds to the trigger moving to the on position, and activates the system. A trigger off circuit responds to the trigger moving from the on position to the off position within a predetermined period of time after the trigger was moved to the on position. A latch on circuit responds to the trigger moving from the on position to the off position after a predetermined period of time after the trigger was moved to the on position. A latch off circuit responds to the latch on output and the trigger moving from the off position to the on position, or from the off position to the on position and back to the off position.

According to another alternative at least two of the latch on circuit, latch off circuit, trigger on circuit, and trigger off circuit form a single circuit.

According to another alternative a welding power supply or system control panel is connected to the controller. A first user selectable input device is located on the control panel. The first device provides a first user selected setting provided to the controller. A second user selectable input device is located remotely from the control panel, and selects a second user selected setting between a predetermined value and a value responsive to the first user selected setting. The second user selectable input device is located on a welding torch, and relates to wire feed speed in various alternatives.

According to another alternative a user selected run-in setting connected to the controller. It has a range from a minimum to a maximum, and the maximum is dependent on the second user selected setting, and the maximum is the second user selected setting in various embodiments.

Other principal features and advantages of the invention will become apparent to those skilled in the art upon review of the following drawings, the detailed description and the appended claims.

Figure 1:
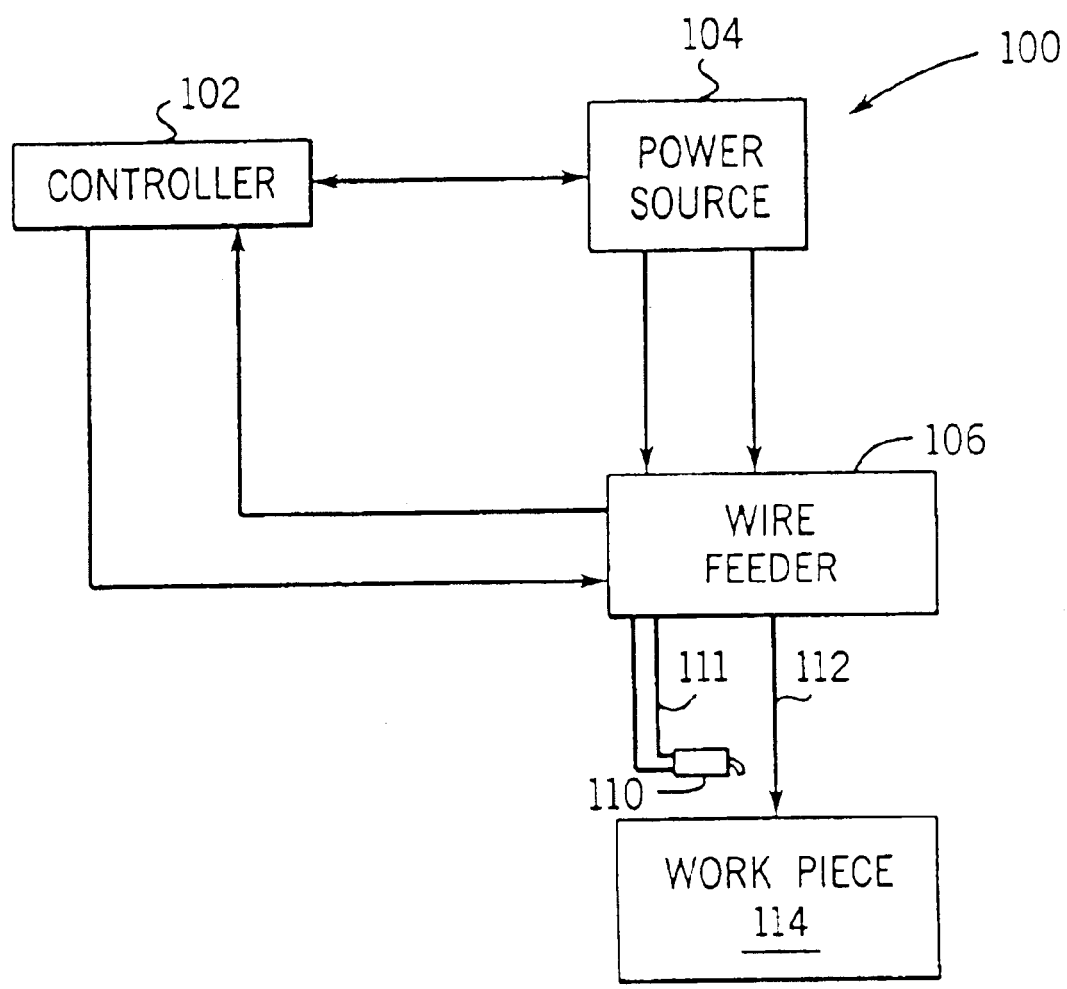
FIG. 1 is a block diagram of the preferred embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular components, embodiments, circuit diagrams and flow charts, it should be understood at the outset that the invention can also be employed with other components, embodiments, circuits, programs, etc.

The invention generally relates to welding systems having power sources used with wire feeders, and controlling the feeding of the wire to the workpiece. The invention is easily understood with respect to prior welding power supplies, such as the Miller XRW or XRA® wire feeders, used with, for example, a Miller Delta Weld® power source.

The invention provides that the latch or trigger hold is provided when the welder pulls the trigger, and keeps it pulled for more than a predetermined time. The predetermined time may be user adjustable, for example by a potentiometer on the control panel. This allows the user to spot or tack weld and continuous weld by controlling the time the trigger is pulled. Spot welding is performed by pulling the trigger for a brief period of time (less than the predetermined time), and when the trigger is released the latch is not set, and thus the wire feeder will stop feeding wire and the source of power will stop providing power. However, for continuous welding the trigger latch is set when the user holds the trigger pulled for more than the predetermined time.

Additionally, the controller of the present invention provides that the user may set the wire feed speed at either the control panel or at the torch. (As used herein gun or torch refer to any mechanism between which it and the workpiece the arc is formed). The control at the torch is dependent on the setting on the control panel. For example, in the preferred embodiment, the control at the torch allows the welder to select between the minimum wire feed speed and the setting on the panel. Other embodiments allow the control at the torch to adjust the wire feed speed over a range around the wire feed speed set at the panel. Preferably, both wire feed speed selectors are potentiometers.

The invention also provides that the run-in speed selection made on the control panel is dependent upon the wire feed speed set at the panel (or set by the torch). Specifically, in the preferred embodiment, the run-in speed is selected in a range varying from the minimum speed to the wire feed speed set on the panel or at the torch. Thus, the user is more easily able to control the run-in speed, particularly in its relationship to the wire feed speed when welding.

FIG. 1 shows a block diagram of the preferred embodiment of the present invention. A welding power supply or system 100 includes a power source 104, a controller 102, a wire feeder 106, a torch 110, and a pair of output power lines 111 and 112. A workpiece 114 is also shown. (Power source, as used herein, refers to the device (often including transformers, switches and/or SCRs) that converts line power to welding power, such as a Miller Delta Weld®. Source of power, as used herein, refers to a power source, or any other source of power, including the input connected to the wire feeder on which power is provided.) Generally, these components may be of the type known in the prior art. For example, controller 102 and wire feeder 106 may be similar to or based on a Miller XRA or XRW® wire feeder (with controller). Power source 104 may be a Miller Delta weld® source of power.

Controller 102 controls the speed at which wire feeder 106 provides wire to torch 110. Controller 102 also controls the operation of power source 104, turning it on and off and, it power source 104 does not have its own controller, providing the command signal which dictates the output of power source 104.

Torch 110 is used to activate and deactivate the system by pulling and/or releasing a trigger located thereon. The trigger signal is provided to wire feeder 106, and then to controller 102. Controller 102 turns on and off wire feeder 106 and the source of power in response to the trigger signal. As described thus far, the system is consistent with those known in the prior art.

Figure 2:
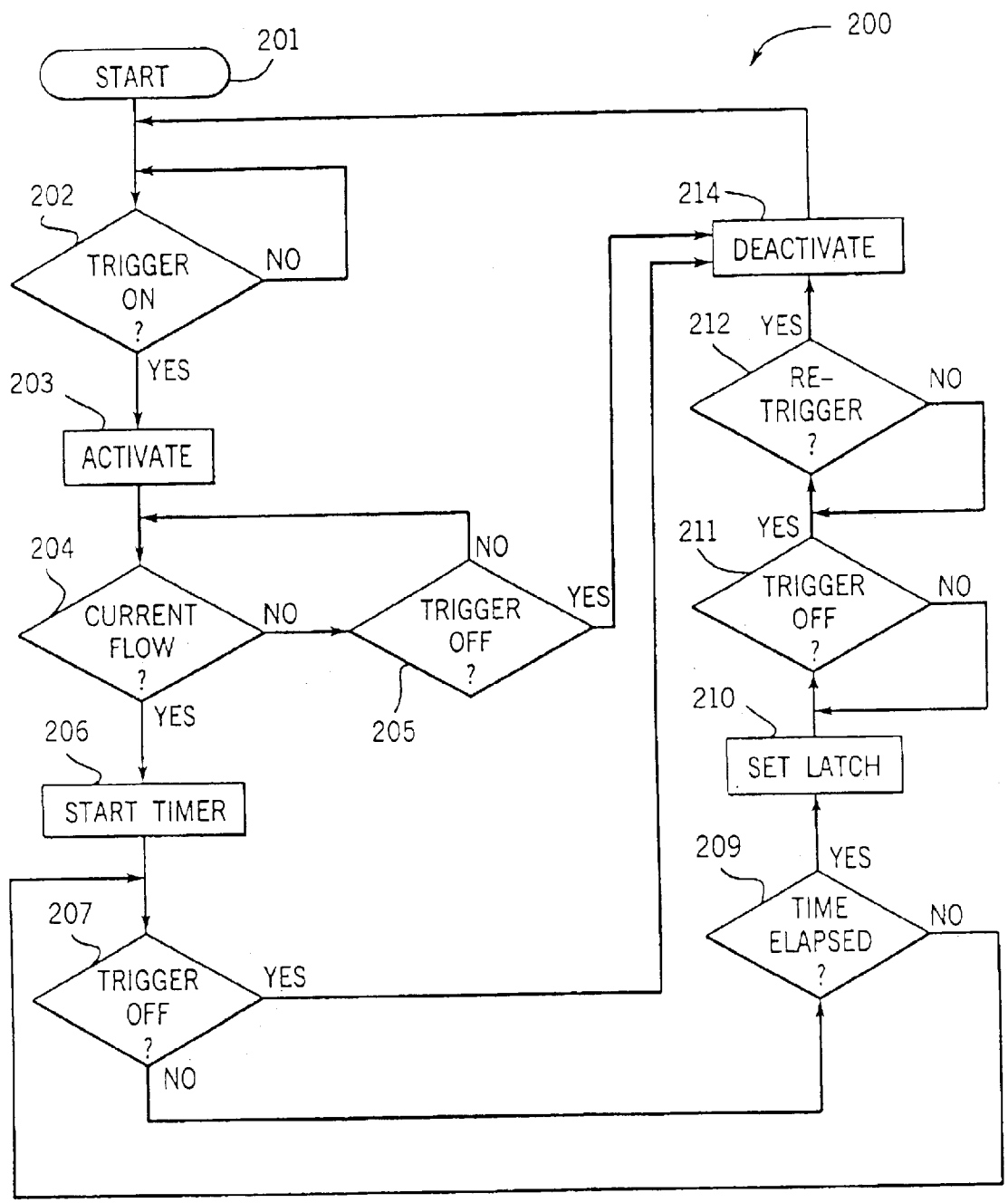
FIG. 2 is a flow chart illustrating one aspect of the preferred embodiment of the present invention.

Referring now to FIG. 2, a flow chart showing one implementation of the invention is shown. The flow chart implements the trigger latch aspect of the invention, wherein the trigger latch is not set unless the trigger is held in the pulled position (or on status) for a predetermined time. The process starts at 201, and at 202 the status of the trigger is determined. Status of the trigger is whether not the trigger is on (or pulled). If the trigger not on the process repeats decision 202, until the trigger is on.

If the trigger is on, the system is activated at step 203. Activation includes turning on at least one of the source of power and wire feeder. In the preferred embodiment the source of power is turned on by activating a relay or contactor (for example in the wire feeder), and the wire feeder is turned on and will feed wire at the rates set by controller 102. In other embodiments only one of the source of power and wire feeder is turned on. Turning on means electronically enabling the output, providing a command, isolating the input power, opening a switch, etc.

After the system is activated a determination as to whether or not current is flowing is made at step 204. This step is not part of the preferred embodiment, but is part of an alternative embodiment. If current is not flowing a determination as to whether not the trigger is in the off position is made at step 205. If the trigger is off, then the system is deactivated at step 214 and returns to the start. If the trigger is on then the process returns to step 204 until current begins to flow.

When current is detected (using any current detection method) at step 204 a timer is started at step 206. This timer sets the predetermined time for which the trigger must be held before the latch is activated. The predetermined time may be set at the factory, maybe fixed, or may be adjustable by the user with a potentiometer on the control panel. Thus, predetermined, as used herein, includes adjustable or fixed values.

After the timer has started the trigger status is again determined at step 207. If the trigger is off then the system is de-activated or turned off at step 214, and the process is restarted. This is the path followed when the user is tack welding.

If the trigger is not off at step 207 then at step 209 it is determined whether not the predetermined time has elapsed. If the predetermined time has not elapsed the process returns to step 207, wherein it continues to check the status of the trigger and then to step 209 where it continues to check the status of time elapsed.

After the predetermined time has elapsed, at step 209, the latch is set at step 210. This is the path taken when using continuous welding. After the latch is set it is determined if the trigger is off at step 211. Step 211 is continually repeated until the trigger is off. After the trigger is off the process monitors for a re-trigger at step 212. Step 212 is repeated until a re-trigger is sensed. A re-trigger may be designated as pulling the trigger, or pulling and releasing the trigger. A re-trigger is used by the welder in the :latch mode to turn off the process. Thus, at step 214 the system is de-activated, and returns to the start.

Figure 3:
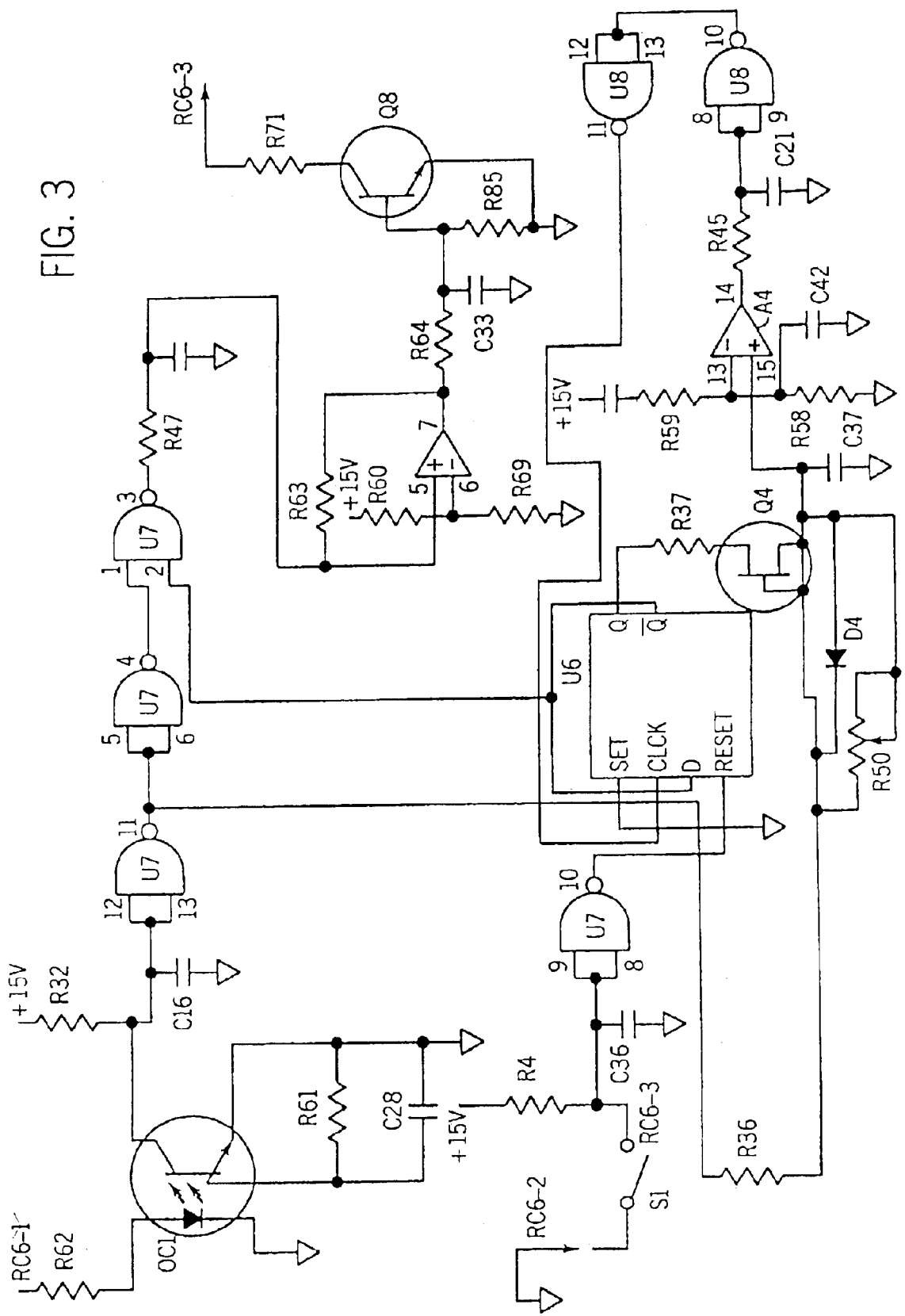
FIG. 3 is a circuit diagram implementing one aspect of the preferred embodiment of the present invention.

A circuit implementing the trigger-hold is shown in FIG. 3. An enable/disable switch S1 is connected between pins RC6-2 and RC6-3). When the switch is closed, the trigger hold is disabled. A trigger signal is received on pin RC6-1, and is buffered and filtered through an optical coupler OC1, a resistor R32, a capacitor C16 and a NAND gate U7 (pins 12, 13, 11).

The trigger signal passes through a NAND gate U7 (pins 5, 6, 4), a NAND gate U7 (pins 1, 2, 3) op amp A4 pins 5, 6 and 7 (having associated circuitry resistors R60, R69, and R63), and an RC circuit R64, C33, and a switch Q8 to trigger or start the wirefeeder (and in some embodiments the power source). This circuitry will activate the system when the trigger-hold is enabled or disabled.

The trigger-hold is provided by flip-flop U6, on the NOT-Q output. The NOT-Q output is provided to NAND gate U7 pin 2, causing the activation signal to remain on, even when the trigger is not pulled (as indicated by the output of NAND gate U7 pin 11.

The latch is controlled by providing the trigger signal (the output of NAND gate U7 pin 11) to the clock input of flip-flop U6 through circuitry including resistors R36, R50, R58, R59, R45, diode D4, capacitors C37, C42, C21, op amp A4 (pins 12, 13 and 14), NAND gates U8 (pins 8, 9, 10) and U8 (pins 12, 13 and 11). An adjustable delay timer is formed by R36, R50, C37, R59, R58, C42 and A4 (pins 13, 12, 14). The timer is adjusted by potentiometer R50.

When the wirefeeder is in not activated, the trigger signal from U7 pin 11 is low, and flip-flop U6 is reset giving a low output on the Q output. The Q output is provided to, and when low turns off a transistor Q4. When the trigger signal coming from U7 pin 11 goes high, the wirefeeder is activated (as described above by U7 (pins 5, 6, 4) and U7 (pins 1, 2, 3).

The signal from U7 pin 11 causes C37 to charge through resistors R36 and R50. A threshold voltage is created on A4 pin 13 via R59, R58, C42 and the +15 volt supply. When the voltage across C37 exceeds the threshold on A4 pin 13 the output of A4 pin 14 goes high. This output is filtered and buffered through R45, C21, U8 (pins 8, 9, 10) U8 (pins 12, 13, 11), and then sent to the clock input of U6 which will cause the outputs Q and not-Q to toggle state if the trigger hold feature is enabled, latching the trigger on. Capacitor C37 is discharged quickly through diode D4 and resistor R36 (and Q4 if it is on) after the trigger is released, to allow other trigger transitions to be recognized.

If the trigger-hold circuit is latched, the wirefeeder will continue running as a result of the low signal coming out of U6 pin 12 and going into U7 pin 2. Also, U6 pin 13 (the Q output) will be on, turning on transistor Q4 through resistor R37. When the trigger is now re-pulled, C37 will charge rapidly through resistor R36 and transistor Q4. This causes the output of A4 pin 14 to go high. This output is again buffered through U8 (pins 8, 9, 10) and U8 (pins 12, 13, 11) and then sent to the clock input of U6 which will cause the outputs Q and not-Q to toggle state, thus removing the trigger-hold latch. The wirefeeder will continue to run as long as the trigger is held pulled.

When the trigger is finally released, the wirefeeder will be turned off through U7 (pins 5, 6, 4) and U7 (pins 1, 2, 3). Also, capacitor C37 will discharge rapidly through D4 and through R36, which is small, into U7 pin 11. This completes the trigger-hold cycle and prepares the circuit for the next trigger Thus, the circuitry accomplishes many of the functions set forth in the flow chart of FIG. 2. The latch on, latch off, turn on, and turn off circuits are combined in a single controller, although they could be isolated in separate circuits.

Another aspect of the present invention is having the wire feed speed selected on the torch be dependent upon, or responsive to, the wire feed speed selected on the control panel. Dependent upon, or responsive to, means that the torch wire feed speed control is a function of the control panel wire feed speed control. According to the preferred embodiment the responsiveness is that the torch wire feed speed control allows the user to select a wire feed speed anywhere from the minimum wire feed speed to the wire feed speed set at the control panel. This allows the wire feed speed selector at the torch to have a greater resolution than if it was required to have a range from the minimal wire feed speed to the system maximum wire feed speed. The greater resolution allows the user to more easily select the desired wire feed speed. Alternative embodiments have a different tendency, for example where the wire feed speed control at the torch is a fixed percentage more or less than the wire feed speed set at control panel.

Another aspect of the present invention is that the run-in speed select on the control panel is similarly dependent upon or responsive to the control panel wire feed speed. The responsiveness, in the preferred embodiment, is also that the maximum run-in speed is the control panel or torch wire feed speed. This also allows greater resolution of the run-in speed selection. Alternative embodiments allow for a different dependency, such as a given percentage greater than or less than the control panel wire feed speed.

Figure 4:
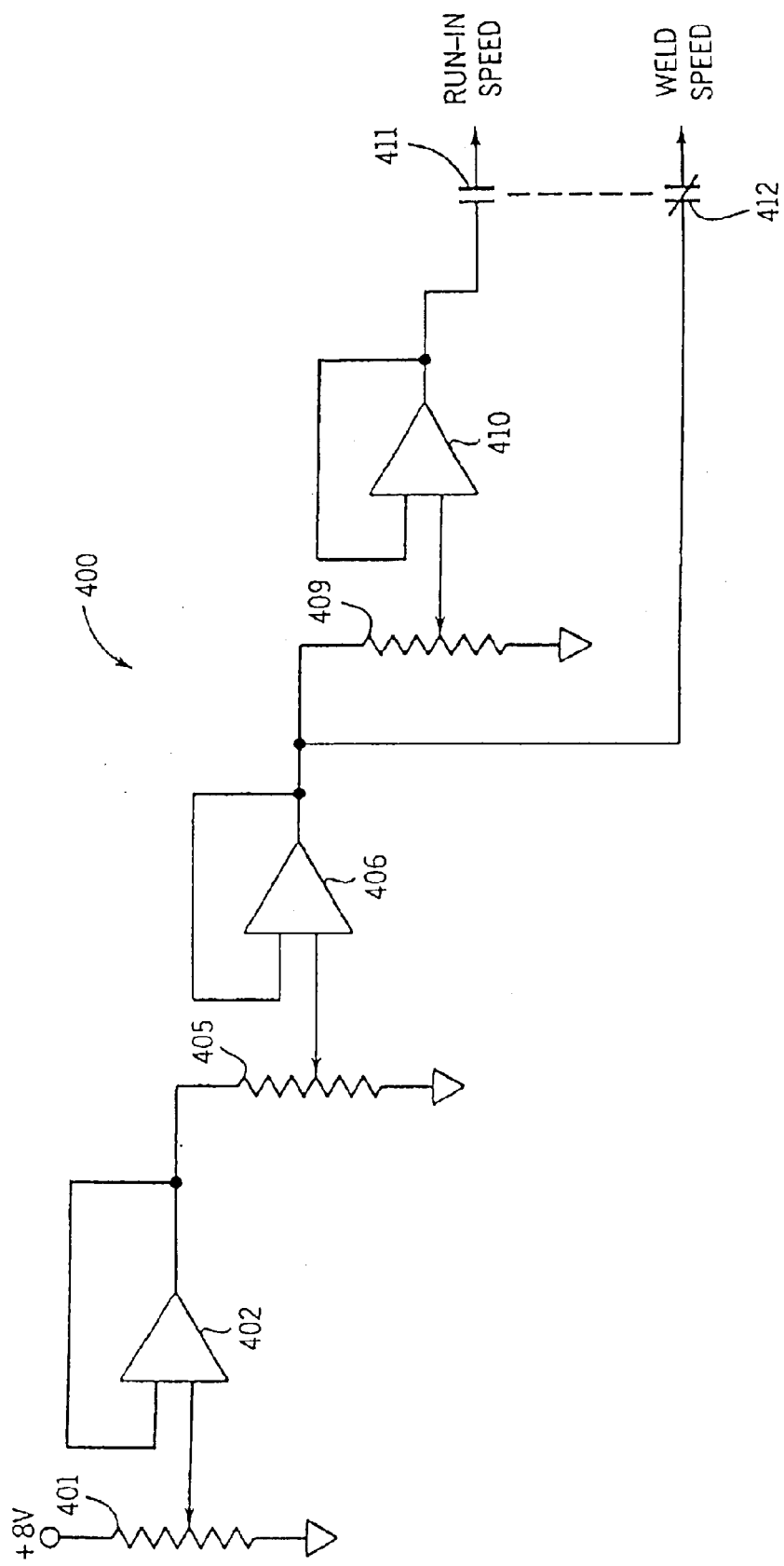
FIG. 4 is a circuit diagram implementing an aspect of the preferred embodiment of the present invention.

FIG. 4 is a diagram of a circuit 400 that implements the torch wire feed speed select and run-in aspects of this invention. Circuit 400 includes potentiometers 401, 405 and 409, op amps 402, 406 and 410, and a relay (or electronic switch) 411, 412.

Potentiometers 401, 405 and 409 allow the user to select various wire feed speeds. Specifically, potentiometer 401 allows the user to set the control panel wire feed speed, and is a potentiometer on the control panel. The potentiometer setting acts as a voltage divider in a conventional manner, and the divided voltage is buffered by op amp 402.

The output of op amp 402 is connected to (in electrical communication with) or provided to potentiometer 405. Potentiometer 405 is the torch wire feed speed selector, and is located on or near the torch potentiometer 405 voltage divides the signal from potentiometer 401. As may be seen, the maximum output of potentiometer 405 is the output of potentiometer 401.

The output of potentiometer 405 is provided through a buffering op amp 406 and a relay 412 to be the welding wire feed speed. Thus, circuit 400 provides a torch wire feed speed selection device responsive to the control panel wire feed speed.

Relay 412 and. 411 are used to select between a run-in speed and a weld wire feed speed. When relay (or electronic switch) 412 is closed, the welding wire feed speed is provided. When relay (or electronic switch) 411 is closed the run-in wire feed speed is selected. Relay or switch 411, 412 is controlled consistent with the prior art, and run-in speed is selected until the arc is established.

If the run-in speed is selected it is obtained from the output of op amp 406 through potentiometer 409. Potentiometer 409 is the run-in potentiometer on the control panel. Potentiometer 409 voltage divide the output of op amp 406, and has as its maximum the output of op amp 406. Thus, circuit 400 provides a run-in speed selection device responsive to the welding wire feed speed. Thus, it may be seen that the run-in speed is set as a percentage of the wire feed speed during welding. Moreover, potentiometer on the torch is set as a percentage of the wire feed speed on the control panel.

Numerous modifications may be made to the present invention which still fall within the intended scope hereof. Thus, it should be apparent that there has been provided in accordance with the present invention a method and apparatus for welding and controlling the activation and wire speed of a welding system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of controlling a welding system comprising:
   sensing a first signal indicative of a first magnitude of a user-set welding parameter from a selector located on a control panel of a source of power;
   defining a range of magnitudes about the first magnitude;
   sensing a second signal indicative of a second magnitude within the range of magnitudes from a remote selector located remotely from the source of power; and
   controlling a system output to have the parameter have the second magnitude.

2. The method of claim 1 wherein sensing the second signal includes sensing a second selector located on a welding torch.

3. The method of claim 1 wherein the range is centered about the first magnitude.

4. A method of controlling a welding system comprising;
   sensing a first user selected magnitude of a welding parameter from a selector located on a control panel;
   defining a range of magnitudes about the first magnitude;
   sensing a second signal indicative of a second magnitude within the range of magnitudes from a remote selector located; and
   controlling the system to operate responsive to the second user selected magnitude.

5. A controller for a welding system comprising:
   means for sensing a first magnitude of a user selected parameter from a selector located on a control panel of a source of power;
   means for defining a range of magnitudes about the first magnitude;
   means for sensing a second magnitude within the range of magnitudes from a remote selector located of a user selected parameter from a remote selector located remotely from the source of power; and
   means for controlling the system responsive to the first magnitude and the second magnitude.

6. The controller of claim 5, wherein the remote selector is located on a welding torch.

7. A welding system comprising:
   power means for providing welding power to a weld;
   a first selector means for receiving a user selected magnitude for a welding parameter, located on a control panel, and for providing first output indicative of the first magnitude;
   means for defining a range of magnitudes about the first magnitude;
   a second selector means for receiving a second user selected magnitude within the range of magnitudes for the welding parameter, located remotely from the power mean, and for providing a second output indicative of the second magnitude; and
   a controller means for controlling the system responsive to the second output.

8. The apparatus of claim 7 wherein the second selector means is located on a welding torch.

9. The apparatus of claim 8 wherein the control panel is on the power means.

10. A welding system, comprising:
    a first selector, located on a control panel of a source of power, and having a user output indicative of a first magnitude of a user-set welding parameter;
    a second selector, located remote from the control panel, and having a second user output indicative of a second magnitude of the user-set welding parameter, wherein the second magnitude is in a range about the first magnitude;
    a controller, connected to and responsive to the second magnitude; and
    a power supply, connected to and responsive to the controller.

11. The system of claim 10 wherein the second selector is located on a welding torch.

12. The system of claim 10 wherein the range is centered about the first magnitude.

13. A controller for a welding system comprising:
    a sensor connected to a selector located on a control panel of a source of power, and having a first magnitude output of a user selected parameter;
    a second selector, located remote from the control panel, and having a second user output indicative of a second magnitude of the user-set welding parameter, wherein the second magnitude is in a range about the first magnitude; and
    an output magnitude controller, responsive to the second magnitude.

14. The controller of claim 13 wherein the remote selector is located on a welding torch.

15. A welding system comprising:
    a power source, disposed to provide welding power to a weld;
    a first user selector, located on a control panel, and providing a first output indicative of a first magnitude of a welding parameter;
    a second user selector, located remotely from the power source, and providing a second output indicative of a second magnitude of the welding parameter, wherein the second magnitude is in a range about the first magnitude; and
    a controller, connected to and responsive to the second magnitude.

16. The apparatus of claim 15 wherein the second selector is located on a welding torch.

17. The apparatus of claim 16 wherein the control panel is on the power source.

* * * * *